(12) United States Patent
Liao

(10) Patent No.: US 9,857,452 B2
(45) Date of Patent: Jan. 2, 2018

(54) METHOD FOR LOCATING AND POSITIONING USING BROADCAST FM SIGNALS AND PHASE DIFFERENCE COMPUTATION TECHNIQUE

(71) Applicant: Henry H. Liao, Los Alamitos, CA (US)

(72) Inventor: Henry H. Liao, Los Alamitos, CA (US)

( * ) Notice: Subject to any disclaimer, the term of this patent is extended or adjusted under 35 U.S.C. 154(b) by 166 days.

(21) Appl. No.: 14/884,576

(22) Filed: Oct. 15, 2015

(65) Prior Publication Data

US 2016/0109553 A1    Apr. 21, 2016

Related U.S. Application Data

(60) Provisional application No. 62/122,254, filed on Oct. 16, 2014.

(51) Int. Cl.
*G01S 5/02* (2010.01)
*G01S 5/10* (2006.01)
*G01S 5/00* (2006.01)
*H04W 64/00* (2009.01)

(52) U.S. Cl.
CPC .......... *G01S 5/0289* (2013.01); *G01S 5/0036* (2013.01); *G01S 5/0226* (2013.01); *G01S 5/10* (2013.01); *H04W 64/00* (2013.01)

(58) Field of Classification Search
CPC ........ H04W 64/00; G01S 5/0252; G01S 5/02; G01S 5/10; G01S 5/0036; G01S 5/0226; G01S 5/0289
See application file for complete search history.

(56) References Cited

U.S. PATENT DOCUMENTS

| 5,173,710 A | 12/1992 | Kelley et al. |
| 5,936,572 A | 8/1999 | Loomis et al. |
| 7,990,314 B2 | 8/2011 | Liao |
| 2009/0322603 A1* | 12/2009 | Liao ............. G01S 5/0257 342/357.29 |

FOREIGN PATENT DOCUMENTS

| CN | 1568434 | 1/2005 |
| CN | 1731893 | 2/2006 |
| TW | 201000939 | 1/2010 |
| WO | 03/036934 | 5/2003 |

OTHER PUBLICATIONS

Hui Lin et. al, Survey of Wireless Indoor Positioning Techniques and Systems, IEEE Transaction on Systems, Man and Cybernetics, Nov. 2007,. p. 1067-1080.

(Continued)

*Primary Examiner* — Charles Appiah
*Assistant Examiner* — Margaret G Mastrodonato
(74) *Attorney, Agent, or Firm* — Kirton McConkie; Evan R. Witt

(57) ABSTRACT

Improved systems for locating and positioning using broadcast frequency modulation signals is provided for previous U.S. Pat. No. 7,990,314. In addition, three or more LPFM local broadcasting stations are used for determination for indoor and/or outdoor 2-D or 3-D locating and positioning system.

13 Claims, 7 Drawing Sheets

(56) References Cited

OTHER PUBLICATIONS

Trong-Hop Do et. al., TDOA-Based Indoor Positioning Using Visible Light, Photonic Network Communication, Apr. 2014, vol. 27, Issue 2, p. 80-88.
Andrei Popleteev et. al., Investigation of indoor localization with ambient FM radio stations, vol. 6, Issue 6, Dec. 2010, p. 642-656,Ubiquitous Interactions group, Create-Net, Trento, Italy.
Andrei Popleteev., Indoor Positioning Using FM Radio signals, Ph.D dissertation, Univ. of Trento, Apr. 2011, entire dissertation). p. 1-160.
Aleksandar Matic, et. al, An Indoor Positioning system based on a WiFi router and FM beacons, 18th Telecommunications forum Telfor 2010, p. 432-435.
Andrei Popleteev, Indoor Positioning Using FM Radio Signals, Universita Degli Studi Di Trento, Apr. 2011 p. 1-76.
Yin Chen, Dimitrios Lymberopoulos, Jie Liu, and Bodhi Priyantha, Indoor Localization Using FM Signals, IEEE Transaction of Mobile Computing, No. 8 Aug. 2013 vol. 12, by 2013, Microsoft Research p. 1502-1517.
Shih-Hau Fang, et al., Metropolitan-Scale Location Estimation Using FM Radio with Analysis of Measurements, Proc. Int'l Wireless Comm. and Mobile Computing, 2008, IEEE. p. 171-176.
Computing Location from Ambient FM Radio Signal Commercial Radio Station Signals, Proc. IEEE Wireless Comm and Networking Conf. 2005p. 824-829.
Indoor Localization with Ambient FM Radio Signals: A fingerprinting Approach, Proc. Int'l Conf. Indoor Positioningand Indoor navigation, 2011 p. 1-7.

* cited by examiner

METHOD FOR LOCATING AND POSITIONING USING BROADCAST FM SIGNALS AND PHASE DIFFERENCE COMPUTATION TECHNIQUE

CROSS REFERENCE TO RELATED APPLICATIONS

This application claims the benefit of U.S. Provisional Application Ser. No. 62/122,254 filed on Oct. 16, 2014, which is incorporated herein their entirety.

FIELD OF THE INVENTION

The present invention is to improve and refine the technique using frequency modulation (FM) pilot tone phase difference for locating and positioning with small deviation of pilot tone frequency. This invention further propose to use three self-installed low power frequency modulation (LPFM) broadcasting stations and use one of the LPFM stations combined with base station for localized or indoor locating and positioning system.

BACKGROUND OF THE INVENTION

Previous U.S. Pat. No. 7,990,314 described the method and system of locating and positioning geographic location using 3 FM broadcast signals; specifically using the demodulated FM pilot tone frequency of 19 KHz pilot phase difference to determine the position of a mobile unit. The technique used for locating or positioning is hyperbolic positioning system or so called TDOA (time difference of arrival) algorithm. Previous invention further proposed to use double differencing of pilot tone phase differences between mobile unit (MU) and base station (BS) for relative positioning. Furthermore the patent proposed using triple differences of double differences pairs to form two linear equations to solve approximate position of (x,y) of MU using incremental triple differences as parametric and double differences pairs as resultants.

BRIEF SUMMARY OF THE INVENTION

A special method of using three local reference stations BS, Rc, Rd located at Cardinal coordinate (0, 0), (Xc, Yc), (Xd, Yd) to measuring three FM stations pilot tone phase differences with the base station (BS) located at origin (0, 0). We then subtract the phase differences measurement at BS from measurements at two reference stations Rc, Rd to form two pairs of double phase differences at BS. With two known locations (Xc, Yc), (Xd, Yd) and two pairs of double differences, we then form 4 linear equations to solve four unknown parametric $\Delta\underline{h}_{12}$, $\Delta\underline{v}_{12}$, $\Delta\underline{h}_{13}$, $\Delta\underline{v}_{13}$ (which were defined as triple differences in U.S. Pat. No. 7,990,314). The two pairs of measured double differences of Rc and Rd will be the resultant to solve four linear equations with four unknown parametric. Once parametric $\Delta\underline{h}_{12}$, $\Delta\underline{v}_{12}$, $\Delta\underline{h}_{13}$, $\Delta\underline{v}_{13}$ are solved, the position of MU (x, y) can be determined by solving the two linear equations with 4 parametric and using double difference pair of MU as resultants.

Furthermore this invention looks into the problem of imprecise pilot tone frequencies (i.e. pilot tone deviated from 19 KHz) among three FM stations. The measurement technique to cope with the relative phase drift problem due to imprecise pilot tone is proposed.

In previous invention, we propose the use of three LPFM (Low Power Frequency Modulation) station permitted by FCC for localized or indoor positioning using 19 KHz FM pilot tone. The current invention further generalized the pilot tone modulating FM carrier to a general sinusoidal waveform modulating a general carrier for local or indoor locating and positioning applications and use three LPFM stations and one of the LPFM doubled up as BS to locate MU.

These and other features, aspects and advantages of the present invention will become understood with reference to the following description, appended claims and accompanying figures.

DETAILED DESCRIPTION OF THE INVENTION

The present invention provides a system for locating and positioning using three broadcast frequency modulation (FM) signals. It is a continuation of previous U.S. Pat. No. 7,990,314 by the same author. In most practical embodiment, three reference stations (RS) are used to assist determination of MU position using two linear equations solution, when broadcast FM stations are far away (over 1 kilometer). The detail description of using two linear equations to solve the MU position (x, y) is described in previous referenced US patent. We hereby define the term "locating" means determining the position of MU at BS, while the "positioning" means the MU needs to determine its position via communicating with BS.

We also encounter the problem of precise phase measurements of imprecise three pilot tone frequencies. In particular, the problems of 1) deviation of pilot tone frequency from 19 KHz at different FM stations, 2) the phase drift problem between two pilot tones versus time, 3) measurement of pilot tone frequencies and phases with imprecise computer counter frequencies.

We then explored the locating and positioning with three LPFM stations in localized area using a sinusoidal waveform signal modulating LPFM carriers. With this in mind, this invention explains the details of the problem and provides solutions to the above problems.

Three Reference Stations and Three FM Stations (3×3) Positioning Technique

Figure 1:
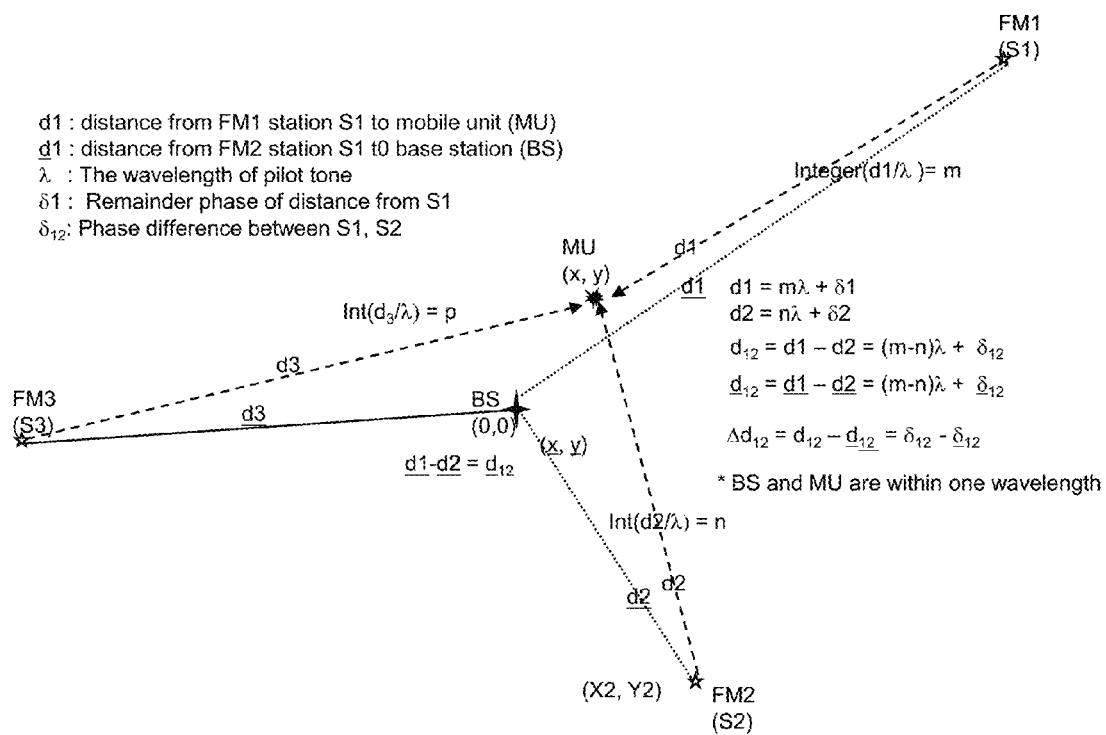
FIG. 1 is graphical illustration of BS and MU phase differences and double differences.

FIG. 1 is an exhibit of MU relative to BS where three FM stations (FM1, FM2, FM3) pilot tone signals S1, S2, S3 are received simultaneously by BS, two Reference stations (Rc, Rd) and one or more MU(s). A Cardinal coordinate local area map is used for positioning of unknown MU(s). BS and Rc, Rd are located at known coordinate (0, 0), (Xc, Yc), (Xd, Yd) respectively. The 19 K pilot tones of three FM stations are demodulated and extracted by all four stations. In FIG.

1, since the BS and MU are nearby, the distance to FM1, FM2, FM3 stations related to wave length and phase equations are:

$$d1=m\lambda+\varphi1 \quad d2=n\lambda+\varphi2 \quad d3=p\lambda+\varphi3 \text{ from MU}$$

$$\underline{d1}=m\lambda+\underline{\varphi1} \quad \underline{d2}=n\lambda+\underline{\varphi2} \quad \underline{d3}=p\lambda+\underline{\varphi3} \text{ from BS}$$

where $\lambda$ is the wave length of 15789.47 meter of 19 KHz pilot tone and $\varphi$ is the phase measurement in terms of distance. The underline $\underline{d1}$ denote the measurement at BS. Since the area is confined in local area, the MU and BS are in the same wavelength range (m, n and p wave length). The phase difference (in terms of distance d1, d2) between two FM stations measured at MU and BS are:

$$d_{12}=d1-d2=(m-n)\lambda+(\varphi1-\varphi2)=(m-n)\lambda+\delta_{12} \text{ at MU} \quad (1)$$

$$\underline{d}_{12}=\underline{d1}-\underline{d2}=(m-n)\lambda+(\underline{\varphi1}-\underline{\varphi2})=(m-n)\lambda+\underline{\delta}_{12} \text{ at BS} \quad (2)$$

It was discussed in detail in U.S. Pat. No. 7,990,314 that the measured phase difference $\delta_{12}$, $\underline{\delta}_{12}$ contain both the original phase biases between FM stations as well as the true phase differences (due to distance of transmission from FM stations). The original phase bias is due to the S1, S2, S3 are not transmitted at synchronized time. Since the original phase bias between FM stations does not change with distance of transmission, the subtraction of phase differences measurements, i.e. ($\delta_{12}-\underline{\delta}_{12}$), will cancelled out the original phase bias between stations. Therefore, the double phase differences between $\Delta d_{12}$ and $\Delta \underline{d}_{12}$, $\Delta d_{13}$ and $\Delta \underline{d}_{13}$ will reflect the true measured double phase differences in received pilot tones, they are $$\Delta d_{12}=d_{12}-\underline{d}_{12}=\delta_{12}-\underline{\delta}_{12} \quad \Delta d_{13}=d_{13}-\underline{d}_{13}=\delta_{13}-\underline{\delta}_{13} \quad (3)$$

It is noticed that if the BS, Rc, Rd and MU are in the same wavelength area (i.e. within 15.789 km range), only the phase differences remain and the integer wavelengths m, n and p disappear after phase differences subtraction. Most importantly, since the double differences subtraction eliminates the original phase bias between two FM stations, the measured double phase difference will be the true "measured" distance difference between two FM stations by converting pilot tone phase into unit of distance.

Since there are three FM stations, the phase differences are subtracted between (S1, S2) and (S1, S3) in two pairs. The third subtraction is unnecessary since it is borne in the two pairs of differences. Therefore, the differences pairs obtained in MU and BS are also in pairs.

It was discussed in U.S. Pat. No. 7,990,314. In a large area with FM broadcasting stations in tens of miles away, the non-linear hyperbolic curve becomes nearly linear in a local area of application. Therefore, linear equations can be used to approximate the position of unknown MU near BS with high accuracy. The position of MU (x, y) relative to the BS at coordinate (0, 0) is differentiated by the double differences pair ($\Delta d_{12}$, $\Delta d_{13}$) from three FM stations. It was discussed in previous patent, the small increments in X and Y coordinates of double differences are defined as triple phase differences increments in X direction (horizontal) as $\Delta h_{12}$, $\Delta h_{13}$ and in Y direction (vertical) as $\Delta v_{12}$, $\Delta v_{13}$. The subscripts of $\Delta h_{12}$, $\Delta h_{13}$ denote the differential increments from double phase differences of (S1, S2) and (S1, S3) in the X-coordinate. And likewise $\Delta v_{12}$, $\Delta v_{13}$ are the differential increments in Y-coordinate. The linear equations to solve MU position proposed in previous patent with triple phase differences increments were:

$$x\Delta h_{12}+y\Delta v_{12}=\Delta d_{12m}$$

$$x\Delta h_{13}+y\Delta v_{13}=\Delta d_{13m} \quad (4)$$

Where (y, y) is the unknown position of MU, and $\Delta d_{12m}$, $\Delta d_{13m}$ are the double differences pair between the MU (with subscript m) and BS, and where the triple phase differential increments $\Delta h_{12}$, $\Delta v_{12}$, $\Delta h_{13}$, $\Delta v_{13}$ can be treated as the parametric to solve the two liner equations. In this invention, we will treat them simply as linear equation parametric for solving MU position.

Figure 2:
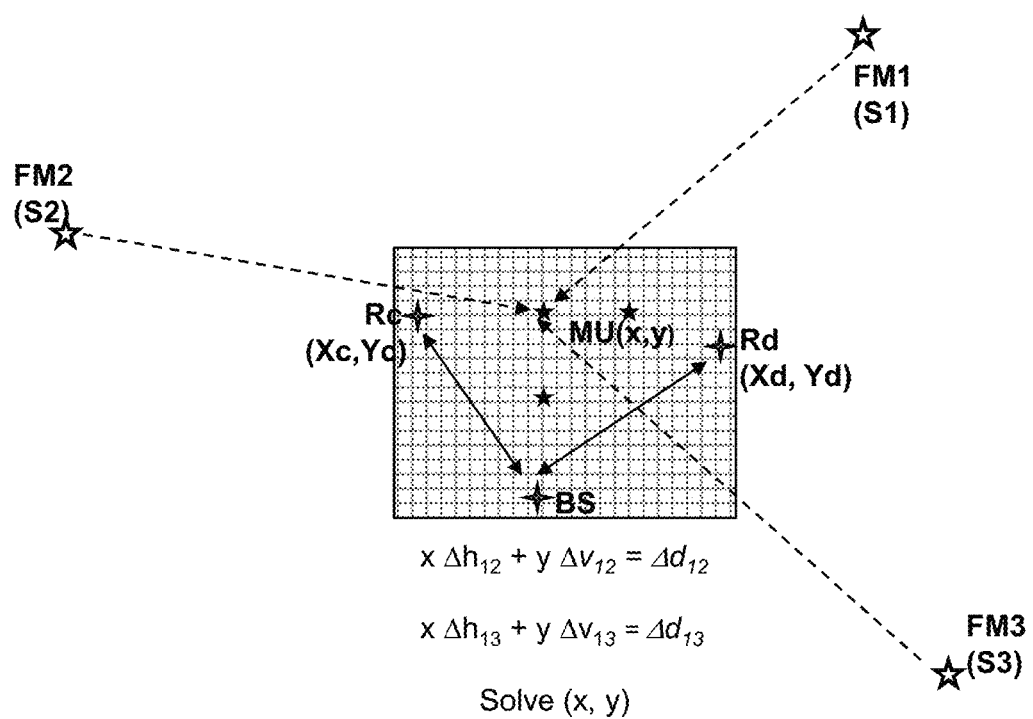
FIG. 2 shows 3 FM stations with 3 Reference Stations (3×3) positioning technique.

In FIG. 2, this invention propose a new approach to use BS with two more local reference stations Rc, Rd in order to determine the parametric $\Delta h_{12}$, $\Delta v_{12}$, $\Delta h_{13}$, $\Delta v_{13}$ instead of using local measurement of the triple differences increments as proposed in previous patent.

BS, Rc and Rd are at known coordinates (0, 0), (Xc, Yc), (Xd, Yd) respectively. As shown in FIG. 2, if the two reference stations with known positions to replace unknown (x, y), the two linear equations for position solution of Rc would be:

$$Xc\Delta h_{12}+Yc\Delta v_{12}=\Delta d_{12c}$$

$$Xc\Delta h_{13}+Yc\Delta v_{13}=\Delta d_{13c} \quad (5)$$

For the position solution of Rd would be $$Xd\Delta h_{12}+Yd\Delta v_{12}=\Delta d_{12d}$$

$$Xd\Delta h_{13}+Yd\Delta v_{13}=\Delta d_{13d} \quad (6)$$

Where $\Delta d_{12c}$, $\Delta d_{13c}$, $\Delta d_{12d}$, $\Delta d_{13d}$ are double phase differences measured at reference stations Rc, Rd relative to BS.

Now with known coordinate position of (Xc, Yc), (Xd, Yd) relative to BS (0, 0), we can rearrange the linear equations in (5), (6) to solve the unknown parametric $\Delta h_{12}$, $\Delta v_{12}$, $\Delta h_{13}$, $\Delta v_{13}$ as follows:

$$Xc\Delta h_{12}+Yc\Delta v_{12}=\Delta d_{12c}$$

$$Xd\Delta h_{12}+Yd\Delta v_{12}=\Delta d_{12d} \quad (7)$$

and $$Xc\Delta h_{13}+Yc\Delta v_{13}=\Delta d_{13c}$$

$$Xd\Delta h_{13}+Yd\Delta d_{13}=\Delta d_{13d} \quad (8)$$

Therefore, with two pairs of linear equations and two pairs of unknowns, the unknown parametric values of $\Delta h_{12}$, $\Delta v_{12}$ and $\Delta h_{13}$, $\Delta v_{13}$ can be solved respectively.

With the solution of $\Delta h_{12}$, $\Delta v_{12}$, $\Delta h_{13}$, $\Delta v_{13}$ on hand, the position of MU (x, y) can be easily solved in equation (4). Therefore, this invention proposes an easy way to find parametric toward the solution of MU position using two additional reference stations Rc, Rd nearby BS. This is an improvement of previous patent relying on local step by step measurements to determine the parametric $\Delta h_{12}$, $\Delta v_{12}$, $\Delta h_{13}$, $\Delta v_{13}$.

Pilot Tone Frequency Variation Problem and Proposed Solution

The demodulated FM pilot tone frequency is supposed to be 19 KHz by standard. However, FCC allows 19 KHz±2 Hz variation of pilot tone in broadcasting FM stations. The variation of pilot tone frequency example are illustrated in Table 1 from 4 FM stations

TABLE 1

| 4 FM Stations Frequencies Variation | | | | |
|---|---|---|---|---|
| Station | S1 | S2 | S3 | S4 |
| Pilot tone | 18999.77 | 18999.89 | 18999.89 | 18999.27 |

It is noticed in Table 1 that each station has slight variation of frequency. The largest variation between S2 and S4 is 0.636 cycles per second in this example. This represents the phase shift amount per second between the two FM pilot tones. Based on the wave length of 15789.47 meters for 19 KHz pilot tone, the phase shift represents a distance shift of 10042.1 meters per second. It is a great amount of distance variation which is not acceptable for position determination if we measure the phase differences of two pilot tones at different times. Therefore, previous definition of phase differences and double differences are varying with time if two pilot tones are not exactly 19 KHz. As a result, this invention proposes that the phase differences measurement in the BS, RS(s) and MU must be synchronized with respect to a fix point of time instant. However, a slight time difference in micro-second (µs) range is acceptable. For example, a 1 µs time error only results in around 1 cm distance error in the above example. This is acceptable in locating or positioning application.

In conclusion, the locating and positioning method proposed in previous U.S. Pat. No. 7,990,314 must be based on pilot tone of exact 19 KHz in three FM stations. If any variation between pilot tone frequencies, we must then put an additional requirement of pilot tone phase measurement at synchronized time.

Throughout the IEEE publications, synchronization is not a simple problem with straight forward solution. There are numerous publications in different magazines on the subject of synchronization between two stations. None of those complicated synchronization techniques is suitable for our low cost applications.

In the subject invention, the time synchronization between BS and Rc, Rd is not a problem since they are fixed stations with frequent two-way communications contact with BS. For the MU, there are many ways of time synchronization between BS and MU. One way is to use a GPS clock (accurate to µs) for all BS, RS and MU. However, GPS receiver and clock is a luxury and expensive solution for low cost MU. The other way is using two way dialogues for synchronization.

Figure 3:
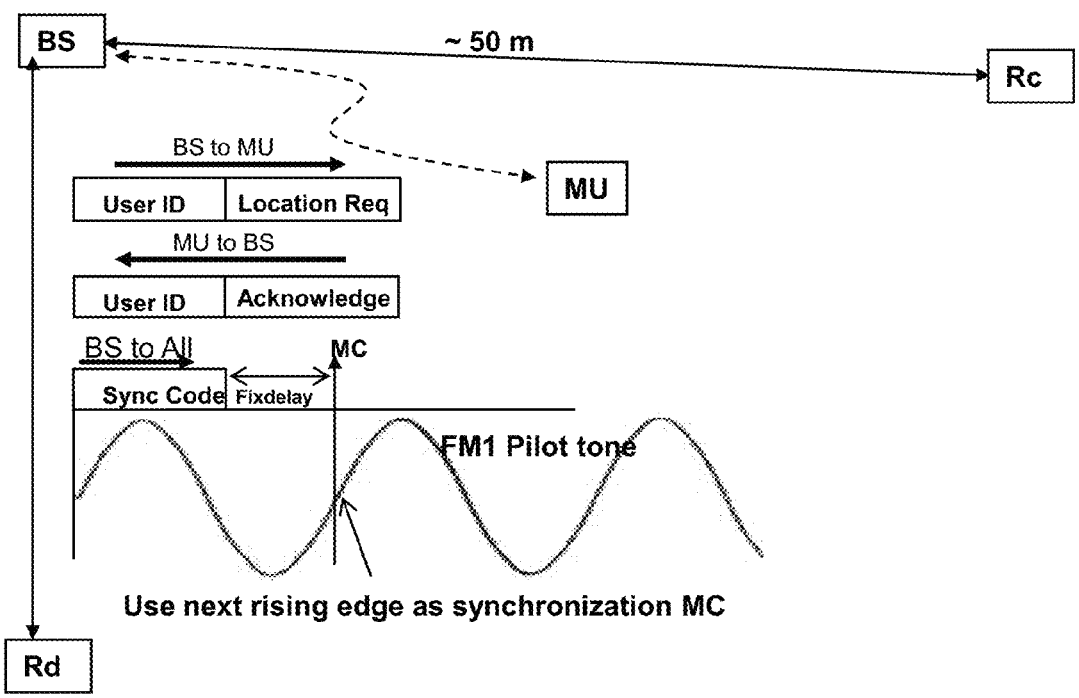
FIG. 3 shows an example of time synchronization dialogues between BS, Rc, Rd and MU.

FIG. 3. illustrates a local or indoor communication among BS, Rc, Rd and many MUs. The environment may be confined in an area no larger then 1 square kilometer, since 1 kilometer will result in transmission delay of only 3.3 µs. The communication among BS, MUs, Rc, Rd use wireless communication such as commercially available Zigbee system or WiFi network.

As illustrated in FIG. 3, the BS first makes a location request to MU with an ID of MU (or MU can initiate the request for positioning itself). The location request is also received by Rc and Rd to get ready for synchronization. Next, the MU received the request and return with an acknowledgement. Then, the BS send a synchronization code to the MU as well as Rc, Rd indicating the synchronization time will start right after the synchronization code is completed. The two Rc, Rd and MU shall be ready to synchronize after the last bit of the synchronization code; or a pre-agreed delay after the last bit of synchronization code is received. Since the maximum transmission delay is 3.3 µs for 1 km, it represents the maximum timing error of synchronization.

In this invention, we propose a simple way to synchronize the MU, Rc and Rd using a pre-agreed existing FM station pilot tone out of three FM stations. The BS will send a synchronization code to all stations including MU, Rc and Rd after the MU acknowledgement. All stations then synchronize on the next rising edge of pre-agreed pilot tone sine wave after the synchronization code is completed. Using this method, we have to know how long the synchronization code last. It may last more than one cycle of pilot tone. We denote the rising edge synchronization time as Master Clock (MC) hereafter. The MC is a computer counter clock stating from zero. At the MC, the MU and Rc, Rd and BS will perform phase measurement of S1, S2, S3 in serial or parallel processing relative to a fix point of time MC. By doing so, the phase shift of pilot tones variation versus time problem is avoided. In serial processing, all three FM pilot tones phase measurements are related back to a fix point in time MC. Therefore, the positioning of MU is determined at the time MC. Since position determination of MU takes only few seconds, we expect the position of MU does not change much if it is not a fast moving object. However, one may notice that the pilot tone rising edge is a zero crossing time (an analog number) of pilot tone, it is rarely collided at the zero computer counter (digital). This small difference in rising edge and MC is reflected in the averaged phase measurement rising edge versus MC, which is rarely zero at all measurements.

The phase measurements are converted to distance unit to obtain measured distance differences pair ($d_{12}$, $d_{13}$). The distance differences pairs measured at Rc, Rd and MU are sent to BS via two way communication channel such as Zigbee or WiFi. BS then performs the double differencing subtraction to obtain double differences pairs described in equation (3). The double differences pairs are used to solve the position of MU by the linear equations discussed previously in equation (7), (8) and (4).

The above described technique is only one technique of time synchronization. There are various techniques existing of performing time synchronization between BS and MU. This invention proposes this unique synchronization technique by using the existing pilot tones waveform without any external synchronization signal.

Phase Measurements Under Pilot Tone Frequency Variations

In GPS navigation, the time synchronization between MU and GPS satellite and the positions of GPS satellites are crucial elements of precise positioning. With light speed of 300,000,000 meter per second, one nanosecond ($10^{-9}$ S) of timing error will result in 30 cm of distance error. The distance error will propagate to position error. Therefore, GPS solution needs a fourth satellite equation to solve the timing error variable between receiver and GPS clock.

In the subject invention, the phase measurement timing precision is also critical to the position accuracy as discussed in previous section. Since we emphasize a low cost solution for locating and positioning, the cost of high precision phase measurement is not affordable. With FM hardware receiving pilot tone and computer to measure the rising edge of pilot tone, the precision of one phase measurement will be very coarse and limited by the resolution of integer computer counts. Since 19 KHz pilot tone and its phase are analog signals. Using the digital computer counter to measure the analog pilot tone wavelength and phase will result in quantization error in one measurement. However, after thousand of counts are averaged, the wavelengths and phases are converged to decimal numbers close to the true wavelength and phase. These decimal numbers are then converted to distances in meters. This invention proposes a specific technique to deal with phase measurement of three different pilot tones with variation of frequencies, particularly three pilot tone frequencies with small variation.

Using FM hardware and computer to detect and measure pilot tone phases of three FM stations, it is very likely that different FM receiver hardware may have small variation of hardware gate delay that causes relative timing error of phase arrival time. If we use a single channel of hardware for serial processing of three FM pilot tones, any gate delay will be identical among three pilot tones. After subtraction of two phase measurements, the identical gate delays are cancelled out. Therefore, we conclude that a single channel of hardware by repetitive serial processing of multiple FM stations is the best solution for precision phase detection at lowest cost. However, as the technology advances, it is entirely possible that parallel processing use digital signal processor can be used to find the phase differences by cross correlation of two sinusoidal signals at the MC. This invention proposes an example of low cost approach of using serial processing hardware. It does not exclude the parallel processing approach using more complicated digital signal processor (DSP).

Figure 4:
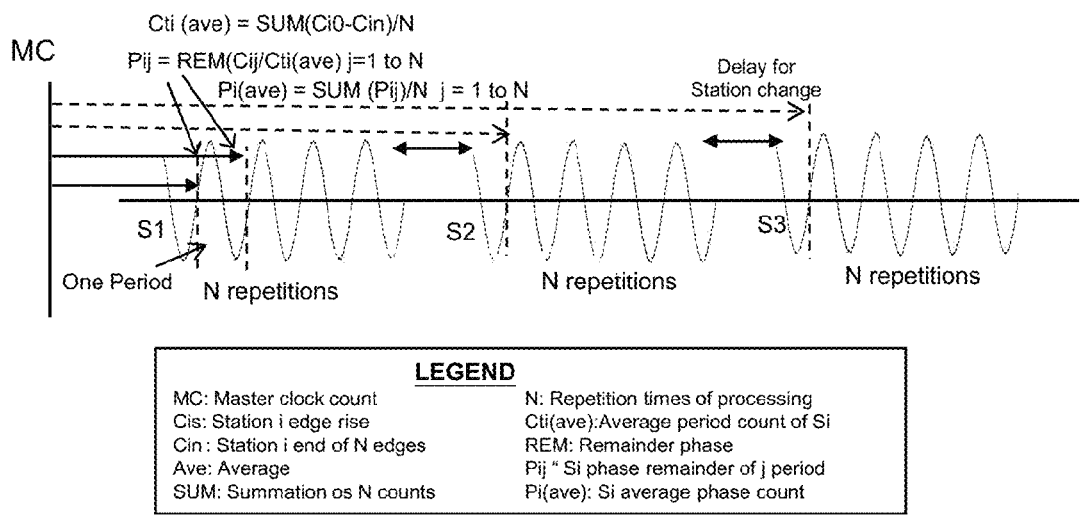
FIG. 4 shows repetitive and serial phase measurements of two sinusoidal waves relative to MC.

In FIG. 4, an example of serial phase measurements of three FM pilot tone frequencies is illustrated. The pilot tones are S1, S2 and S3. As we discussed previously, the phase measurement must be based on synchronized time, i.e. relative to MC as indicated in FIG. 4. We are using the computer counter to register the counts of rising edges N times of S1, S2 and S3 in serial sequences. The starting rising edge of an FM station Si pilot tone is denoted as Ci0 and rising edge of N cycles of pilot tone is Cin. Then the average period Cti(ave) of Si pilot tone in mathematical expression is $$Cti(\text{ave}) = (Cin - Ci0)/N \tag{9}$$

Where Cti(ave) will be converted to the wave length of the pilot tone in decimal number with high precision (i.e. less than centimeter).

To compute the exact frequency of a pilot tone, a reference frequency of 19 KHz is generated by the computer (calibrated by a GPS clock, for example) and the computer counts Ct(19 k) is averaged by similar method as previous measurement of FM station pilot tone. Then the station pilot tone Pilot(i) frequency is derived as follows:

$$\text{Pilot}(i) = 19\text{ KHz} \times (Cti(\text{ave})/Ct(19\text{ k})) \tag{10}$$

And the wave length WLi of Cti(ave) pilot tone is:

$$WLi = 300,000,000 \text{ m}/\text{Pilot}(i), \tag{11}$$

where the real pilot tone wave length WLi is used to convert averaged phase count to distance.

Next step will be the phase measurement of three pilot tones relative to MC. The computation of phase can use the same set of N rising edge counts stored in memory. Each rising edge count relative to MC consists of integer number of average wavelength counts Cti(ave) and the remainder count. The remainder count (REM) is and integer count close to the phase relative to the MC. It is noted that the MC is a fix point in time when computer count is zero, the phase of a pilot tone does not change relative to MC after integer number of average wavelength is removed. Therefore the phase don't change in subsequent two FM stations due to the time delay, since the period of FM pilot tones are uniform within the measuring time duration (a few seconds). The mathematic formula of pilot tone Si measuring jth phase count is:

$$Pij = REM(Cij/Cti(\text{ave})), \; Cij \text{ is } j\text{th rising edge counts of } Si \tag{12}$$

Then the N repetition average phase Pi(ave) is sum (SUM) of N remainders divide by N $$Pi(\text{ave}) = \text{SUM}(Pij)/N, \text{ where } j=1,2,\ldots \text{ to } N \tag{13}$$

The Pi(ave) phase is converted to distance as:

$$di = WL(i) \times (Pi(\text{ave})/Cti(\text{ave})), \text{ where } i=1,2, \text{ or } 3 \text{ for } S1,S2,S3 \tag{14}$$

We can continue the computation of the period and phase of S2 and S3 similarly using equations (13), (14).

After serial processing of S1, S2, S3 pilot tone signals, we obtain three average phase measurement converted to distances as d1, d2, d3 relative to synchronized time MC. The phase differences measured at MU between S1, S2 and S1, S3 relative to MC will be:

$$d_{12m} = d1_m - d2_m \text{ and } d_{13m} = d1_m - d3_m \tag{15}$$

where the subscript "m" denotes the measurements at MU. These measurements are needed for computation of MU locations listed in equation (1)

Similarly, the measurements and computation of the phase differences at Rc, Rd relative to MC is obtained using equations (12), (13), (14). The results are the following, $$d_{12c} = d1_c - d2_c \text{ and } d_{13c} = d1_c - d3_c \tag{16}$$

$$d_{12d} = d1_d - d2_d \text{ and } d_{13d} = d1_d - d3_d \tag{17}$$

The distance differences measurements in (15), (16) and (17) are transmitted to BS to compute the double differences pairs $(\Delta d_{12m}, \Delta d_{13m})$, $(\Delta d_{12c}, \Delta d_{13c})$ and $(\Delta d_{12d}, \Delta d_{13d})$. It is noted that an alternative is to transmit the three phase measurements of MU, Rc, Rd directly to BS for distance differences computation.

The computation of parametric $\Delta h_{12}$, $\Delta h_{13}$, $\Delta v_{12}$, $\Delta v_{13}$ is then performed at the BS using equations (7) and (8) with known position of Rc, Rd and the resultant inputs of double differences pairs $(\Delta d_{12c}, \Delta d_{13c})$ and $(\Delta d_{12d}, \Delta d_{13d})$. The position (x, y) of MU is then solved by the two linear equations (4) with known parametric $\Delta h_{12}$, $\Delta h_{13}$, $\Delta v_{12}$, $\Delta v_{13}$ and resultant input $(\Delta d_{12m}, \Delta d_{13m})$. If the application is for locating the MU by BS, there is no need to pass the parametric to MU. If the application is for MU to position itself, the BS can send the position solution of MU, or the parametric and double differences to MU. It is assumed MU has the coordinate map to determine its own position.

It is noted that throughout the position computation, the location of three FM stations is not used. Only three local reference positions are needed in positioning MU. This greatly simplifies the local or indoor positioning process without knowing the FM station positions. However, the approximate direction of three FM stations will affect the accuracy of positioning. In GPS it is call dilution of position (DOP). It simple description, if the three FM stations come in near right triangle direction for triangulation (i.e. about 120 degree), it yields the best DOP with highest precision.

Three Self-Installed LPFM Stations for Local TDOA Positioning

Figure 5:
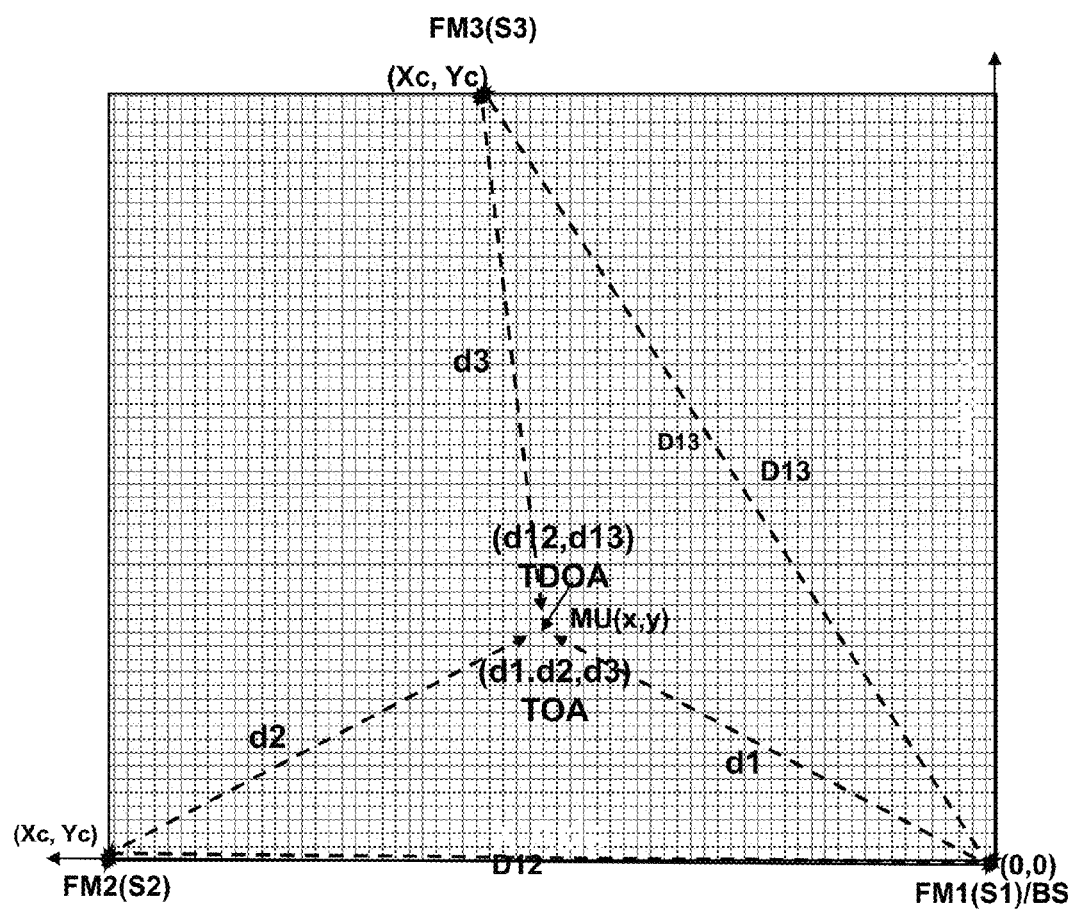
FIG. 5 shows an illustration of using three self-installed LPFM stations for localized positioning.

For indoor or localized positioning application, this invention propose a new way of using only three local LPFM stations with one of the LPFM station doubled up as reference stations to simplify the positioning of MU. In FIG. 5, three LPFM stations are denoted as FM1, FM2, FM3 at known locations which broadcast three generalized FM carriers modulated by three sinusoidal signal S1, S2, S3 (hereafter called "Pilot") of same frequency. It is seen in FIG. 5 that the three LPFM stations are preferably located at boundary of the localized map forming a triangle for best DOP within the localized map. It is also noted that the LPFM carriers does not have to stay in the commercial 88 MHz to 108 MHz FM broadcasting band. It can use any permissible civil frequency bands; from citizen band around 26 to 28 MHz up to popular WiFi band at 2.4 GHz. Also the modulating "Pilot" does not have to be 19 KHz either, it can be any sinusoidal wave frequency such as 9 KHz to 1 MHz. For example, if the modulating frequency is 1 MHz, the modulating Pilot wavelength will be 300 meter; which is larger than most of indoor building dimensions. However, 300 meter will not cover a campus of 1 square mile which will create ambiguity in number of wavelength at receiver. The FM modulating signal can be a generalized sine wave tone (such as 10 KHz) similar to 19 KHz pilot tone. Using generalized Pilot signals S1, S2, S3 give this invention more flexibility of choosing carrier frequency band and the ease of FM modulation in mono instead of stereo band.

For local or indoor positioning; since the three LPFM stations are nearby the MU, the linear approximation of hyperbolic equations (with sharper curve) will result in larger position error. Therefore, we adopt a predetermined Cardinal coordinate map with finite grid points for locating MU(s) within a local or indoor area as proposed in previous U.S. Pat. No. 7,990,314. Each grid point corresponds to a memory location storing a phase differences pair. All grid points with phase differences pairs form a "look-up table" in computer memory.

The major improvement from previous patent is the use of only 3 LPFM transmitters with the FM1 doubling up as the only reference station BS. Also, compare to earlier description of using 3 reference stations and three FM transmitters (3×3) locating system, this system reduces to only 3 LPFM transmitters with one transmitters doubling up as BS. In other words, it reduces from 6 stations to 3 stations, which greatly simply the indoor or local positioning systems.

The FM1/BS is located at Cardinal coordinate (0, 0). Since the coordinates of FM2, FM3 are known, each grid point (x,y) can be pre-computed with the distance (i.e. phase) d1, d2, d3 to three FM stations and derive differences pair ($d_{12}$, $d_{13}$) for each grid point. The differences pairs for all grid points of the map are stored in a computer look-up table memory. Hereafter we denote ($d_{12}$, $d_{13}$) as the true computed phase differences pair, while denote ($d_{12m}$, $d_{13m}$) as the measured phase differences pair at MU.

The difference of computed phase differences pair and the measured distance differences pair is that the later pair contains the original station to station bias (i.e. sine wave transmitted at unsynchronized time) as discussed in detail in U.S. Pat. No. 7,990,314. When MU performs phase measurements of Pilot signal S1, S2, S3, it measures the phase differences among three pilot tone signal to obtain ($d_{12m}$, $d_{13m}$) pair. This phase differences pair is commingled with the FM stations original bias in measurement. At the mean time the BS at FM1 also measure the phase differences pair ($\underline{d}_{12b}$, $\underline{d}_{13b}$), which also commingled with original station biases. However, as shown in FIG. 5, D12, D13 are fixed distances of transmission from FM2, FM3 to BS, the Pilot phase measured at BS is therefore added by the amount of D12, D13. Therefore the original station biases denoted as $\chi_{12}$, $\chi_{13}$ can be derived from ($\underline{d}_{12b}$, $\underline{d}_{13b}$) measurements at BS subtracted by D12, D13 transmission delay from Rc, Rd to BS (i.e $d2_b$ and $d3_b$). That is $$\chi_{12}=\underline{d}1_b-(\underline{d}2_b-D12)=\underline{d}_{12b}+D12 \text{ and } \chi_{13}=\underline{d}_{13b}+D13 \tag{18}$$

It is noted that $\underline{d}1_b$ measurement of rising edge of FM1 to BS (0,0) is not 0, since the rising edge (analog measurement of rising edge) and MC (computer digital counter) is rarely happen at the same time. It is also noticed that all phase measurements are relative to the synchronized FM1 rising edge as MC. By subtracting the original station biases from the MU measurement pair, we defined a new double differences pair ($\Delta d_{12m}$, $\Delta d_{13m}$) for this application, that is $$\Delta d_{12m}=d_{12m}-\chi_{12}=d_{12m}-\underline{d}_{12b}-D12$$

$$\Delta d_{13m}=d_{13m}-\chi_{13}=d_{13m}-\underline{d}_{13b}-D13 \tag{19}$$

The original stations biases are subtracted out from ($d_{12m}$, $d_{13m}$) measurements of MU.

The defined "measured" double differences pair ($\Delta d_{12m}$, $\Delta d_{13m}$) is in fact comparable with one of the "computed" phase differences pair ($d_{12}$, $d_{13}$) stored in the look-up table memory. By computer association of measured double differences pair ($\Delta d_{12m}$, $\Delta d_{13m}$) with the look-up table entries, a least square error (LSE) approach is employed. The LSE is the minimum distance (MIN) between the double differences pair ($\Delta d_{12m}$, $\Delta d_{13m}$) and look-up table entries ($d_{12}$, $d_{13}$), that is $$\text{LSE=MIN(SQRT}((\Delta d_{12m}-d_{12})^2+(\Delta d_{13m}-d_{13})^2)) \tag{20}$$

$$\text{Or simply MIN}((\Delta d_{12m}-d_{12})^2+(\Delta d_{13m}-d_{13})^2) \text{ for all table entries} \tag{21}$$

since the square root computation is unnecessary. The position of MU is therefore determined by minimum distance from ($d_{12}$, $d_{13}$) pair associated grid point (x, y).

It is noted that using three LPFM transmitters for locating MU, the biggest advantage over previous section of three reference stations is that no measurement is needed in the other two stations (i.e. Rc, Rd) Only MU relative to BS measurements is necessary with simple station biases removal and table look-up process. This greatly simplified the position computation process of indoor and localized positioning application.

Synchronization Method with Three LPFM Stations Localization

Figure 6:
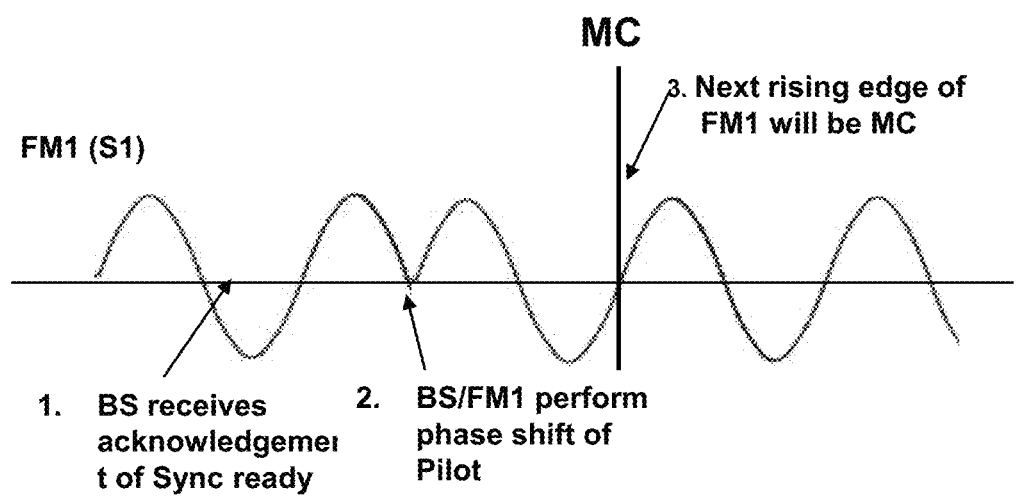
FIG. 6 illustrates synchronization using self-generated phase shift of sinusoidal waveform signaling master clock.

In the measurement of phase and phase differences, the MU and BS must be based on synchronized time MC (counter 0) as discussed in previous sections. A slight difference in modulating frequencies among S1, S2, S3 will result in phase shifting versus time. In this invention, we further propose a simplified synchronization technique to set up the MC. Since the pilot tone signal is self-generated at FM1, we can manipulate the sine wave generation as depicted in FIG. 6; this cannot be done in public commercial FM stations broadcasting. If the pilot tone wave is intentionally phase shifted at certain time as depicted, the next cycle rising edge will be set up as MC for both MU and BS by pre-agreement. The advantage of this synchronization technique is that only synchronization ready is needed from MU to BS. The MU synchronization and positioning is described in the following steps:

1. Either MU or BS initiates the location request, with MU sends acknowledgment to BS.
2. BS then generated phase shift of S1 indicating next rising edge of S1 Pilot will be the MC.
3. MU detects FM1 Pilot phase shift and waits for the next rising edge as MC for sequential and repetitive measurements of phase of S1 and S2, S3 sequentially.

4. After three station phases are measured, MU obtains average phases d1, d2, d3, and then computes $d_{12m}$, $d_{13m}$ and send to BS. BS obtains ($\Delta d_{12m}$, $\Delta d_{13m}$) for table look-up and grid position determination. The grid point with minimum LSE in equation (21) will be declared as the MU position (x, y).

Refinement of Grid Point Positioning

The accuracy of indoor or localized positioning in previous section is limited by the grid point resolution as well as the phase measurements accuracy. The finer the resolution, the larger the look-up table size as well as the computer search and compare time.

In this invention, we propose a two-step (or multiple steps) table look-up approach to simplify the position refinement of MU. For example, if the first table look-up process has a coarser grid resolution of (1 m×1 m). Each grid point can be further expanded into (10×10) table with finer resolution of (10 cm×10 cm) table look-up. Each fine grid point also stores with finer resolution ($d_{12}$, $d_{13}$) entry. The two-step look-up table size will added by 100 times in this example. On the other hand, one may observe that if we choose one-step look-up table using fine resolution of (10 cm×10 cm), the memory size will also grow by 100 times of original table. The memory size will be nearly the same for both cases. However, the searching time of two-step look-up versus one-step look-up is greatly reduced from 100 to 1 in the first step of two-step table look-up. The second step search time for a smaller (10×10) table is a small addition of search time. This process greatly reduces the searching time needed to determine an MU position. It is obvious the two-step table look-up process can be expanded to 3-step or more if further position refinement is needed.

More Than 4 LPFM Stations for 3-D Localized TDOA Positioning

Figure 7:
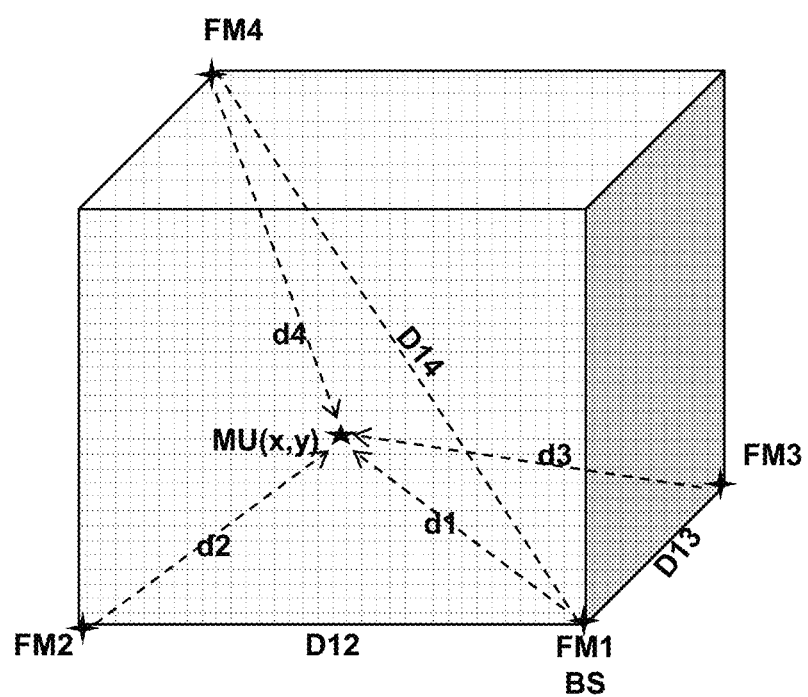
FIG. 7 shows an illustration of using 4 self-installed LPFM stations for 3-D positioning.

For indoor or localized positioning, there may be a need to determine an object in 3-dimensional coordinate. In FIG. 7, a 3-dimensional grid map with 4 LPFM is illustrated. If more than 4 LPFM are installed, the best 4 LPFM with best RSSI received by MU is used. Previous proposed 3 LPFM stations can easily be added with one additional LPFM transmitter at a higher position (such as on top of the ceiling or on roof top). The purpose is to create a better VDOP (vertical dilution of position) for 3-dimensional triangulation with four LPFM stations. The double differences pair in previous section can be easily extended to double differences triplet. For 3-dimensional positioning, the look-up table memory will be consisted of triplet entries ($d_{12}$, $d_{13}$, $d_{14}$) instead of pairs. Correspondingly, the MU and BS will obtain phase differences triplet as ($d_{12m}$, $d_{13m}$, $d_{14m}$) and ($d_{12b}$, $d_{13b}$, $d_{14b}$). The stations biases triplet ($\chi_{12}$, $\chi_{13}$, $\chi_{14}$) can be derived by adding back D12, D13, D14 to ($d_{12b}$, $d_{13b}$, $d_{14b}$) triplet as previously. Double phase differences triplet ($\Delta d_{12m}$, $\Delta d_{13m}$, $\Delta d_{14m}$) is formed by subtracting ($d_{12b}$, $d_{13b}$, $d_{14b}$) and D12, D13, D14 from ($d_{12m}$, $d_{13m}$, $d_{14m}$) to be compared to the triplet entries look-up table in order to determine the MU position at BS. The same LSE method can be used to determine the minimum distance between the measured triplets with the look-up table entries to derive the MU position. Two-step or multiple steps look-up table discussed previously can be used to refine the three dimensional position.

More Than 3 LPFM Stations for 2-D Localized Positioning

For some indoor positioning applications of 2-dimensional positioning, there may be metal wall blockage of LPFM transmission which results in poor reception of one or more LPFM transmissions. More than 3 LPFM stations can be used with additional FM stations located at better positions to avoid wall blockage. In such case, the best 3 LPFM receptions will be used for table look-up positioning. The best 3 LPFM receptions are selected by the carrier frequencies RSSI (Radio Signal Strength Indicator). There will be multiple look-up tables for position solution. For example, if 4 FM stations is used, there will be 4 sets (3 out of 4 combinations) of look-up table needed.

CONCLUSION

The invention is an improvement of previous U.S. Pat. No. 7,990,314. In specific, one of the improvements of the invention proposes to use two additional reference stations (RS) in addition to the BS in a localized area. The two known RS(s) are used to compute the parametric of two linear equations to solve the unknown MU position (x, y) instead of using point by point measurement. It is noted that in this improvement, there is no need of knowing the position of FM broadcasting stations.

This invention also discovered that any slight pilot tone frequency variation can cause phase shift versus time. We proposed a solution to avoid this phase shift problem by using a synchronized master clock (MC) for relative phase measurements. This invention also proposed two unique synchronization techniques using one of the pilot tone rising edge as synchronization time tick.

This invention further proposes to use a generalized sinusoidal waveform (which includes the 19 KHz pilot tone) FM modulating any FCC approved carrier frequency band from Citizen band (26 MHz) to WiFi (2.4 GHz) band. In specific, it is used for indoor or localized locating and positioning applications using any FCC permissible bands and convenience of a general sinusoidal modulating waveform. The application needs only three LPFM stations with one of the stations doubled up as BS. Due to the vicinity of LPFM stations, the invention adopts a table look-up approach similar to previous U.S. Pat. No. 7,990,314 for the positioning of MU since linear equations will result in significant error. Furthermore, in three LPFM systems, the invention proposes to use the BS/LPFM station to intentionally phase shift the sinusoidal waveform generation to signal the next rising edge as synchronization MC.

The invention then proposes to use a two-step or multi-step table look-up to refine the positioning accuracy and saving the search and compare computation time. In addition, the invention proposes to use more than 3 LPFM stations for 3-D localized positioning or more LPFM stations to avoid signal blockage in indoor 2-D positioning.

Advantages

1. The invention is an improvement of previous patent by using two more local reference stations to simplify the computation of parametric used in two linear equation in order to determine the MU position.
2. The invention discover that if the FM or LPFM station pilot tones are not exactly the same, the difference of pilot tones will result in phase shift at different time of measurement. This invention proposes to use a master clock (MC) as a reference time for BS, RS(s) and MU phase measurements, for all three FM stations in serial processing. Furthermore, this invention proposes a unique synchronization technique using the FM pilot rising edge as the MC for phase measurements.
3. The invention further generalized the Indoor or local positioning systems using: a) a generalized sinusoidal waveform FM modulating by any FCC permissible band from 26 MHz to 2.4 GHz, b) using 3 LPFM stations with one doubled as the BS measuring original phase differences to determine the MU position, c) a two-step look-up table to determine the finer position of MU in order to save the searching and compare time.

4. The invention recognizes the power of self-generated LPFM sinusoidal signal generation. It proposed to use the BS/FM1 station to generate phase shift to indicate the next rising edge to be the synchronization MC.

5. The invention proposes to use more than 4 LPFM stations for 3-D localized positioning.

6. The invention further proposes to use more than 3 LPFM stations to avoid signal blockage in 2-D positioning.

As is known to those skilled in the art, the aforementioned example architectures described above, according to the present invention, can be implemented in many ways such as using other frequency modulated three pilot tones of different frequency, using self generated three periodic waveform such as modulated square waveform for phase differencing and double differencing for positioning.

The present invention has been described in considerable detail with reference to certain preferred versions thereof; however, other versions are possible. Therefore, the spirit and scope of the appended claims should not be limited to the description of the preferred versions contained herein.

What is claimed is:

1. An indoor and/or outdoor locating or positioning system utilizing three frequency modulation (FM) broadcast stations or locally installed FM stations, wherein three received FM 19 KHz sinusoidal pilot tones are used for TDOA (time difference of arrival) hyperbolic positioning, and wherein three receiver reference stations designated as a first reference station (Rc), a second reference station (Rd) and a reference base station (BS) are used to assist in locating a mobile unit (MU); wherein said BS is used as base station performing two-way communications with said Rc, Rd and MU to transmit and receive data in order to compute the position of said MU; and wherein said BS, Rc, Rd and MU are equipped with FM receivers and digital processors to perform three phase measurements of said three FM pilot tones, said three phase measurements are subtracted in specified identical order to obtain phase differences pair of said three pilot tones at said Rc, Rd, MU and BS, and wherein said phase differences pairs at said Rc, Rd and MU are transmitted to said BS for locating said MU, wherein said three broadcasting FM pilot tone frequencies are not exactly the same, wherein said BS, Rc, Rd and MU stations measure said phase differences with respect to a synchronized master clock (MC) to avoid phase shift among said three pilot tones versus time, and wherein said MC is used by said BS, Rc, Rd and MU as a reference time tick for phase measurements of said three FM pilot tones by serial or parallel processing.

2. The locating or positioning system of claim 1, wherein said phase differences pair measured at said BS is subtracted from said phase differences pairs measured at said Rc, Rd and MU to form three double differences pairs ($Dd_{12c}$, $Dd_{13c}$), ($Dd_{12d}$, $Dd_{13d}$) and ($Dd_{12}$, $Dd_{13m}$), respectively, and wherein said three double differences pairs are used for position computation of said MU at said BS.

3. The locating or positioning system of claim 2, wherein a localized Cardinal coordinate map is formed with said BS at the origin (0,0) and said Rc, Rd located at known coordinates (Xc, Yc), (Xd, Yd), with said MU at unknown coordinate (x, y), wherein two linear equations are formulated to approximate the solution of said hyperbolic positioning, and wherein four parameters ($Dh_{12}$, $Dv_{12}$) and ($Dh_{13}$, $Dv_{13}$) are defined to multiply said MU coordinate (x, y) in respective order to form two linear equations with said double differences pair ($Dd_{12m}$, $Dd_{13m}$) of MU as resultants of said two linear equations respectively.

4. The locating or positioning system of claim 3 wherein said two linear equations are applied to said two known reference coordinates (Xc, Yc) and (Xd, Xd) replacing said unknowns (x, y) of MU, and wherein said four parameters ($Dh_{12}$, $Dv_{12}$) and ($Dh_{13}$, $Dv_{13}$) are treated as unknowns multiplying said two known coordinates (Xc, Yc) and (Xd, Xd) to form four linear equations in respective order, and wherein said double differences pairs ($Dd_{12c}$, $Dd_{13c}$) and ($Dd_{12d}$, $Dd_{13d}$) are the resultants of said four linear equations respectively, and wherein the solution of said four unknowns ($Dh_{12}$, $Dv_{12}$) and ($Dh_{13}$, $Dv_{13}$) of said four linear equations are used to solve said MU position (x, y) by said two linear equations.

5. The locating and positioning system of claim 1 wherein one of said FM pilot tones is designated as synchronization waveform, and wherein said BS sends out a synchronization ready signal to said Rc, Rd and MU, and wherein the next rising edge of said synchronization waveform, after complete reception of said synchronization ready signal, is recognized by all said Rc, Rd, MU and BS stations as the starting time of said MC.

6. The locating or positioning system of claim 5 wherein said three FM pilot tones with variation of frequencies are measured at said BS, Rc, Rd and MU sequentially and serially relative to said MC with N repetitions of measurements for each FM station, and wherein the averaged phases of N measurements of said three FM pilot tones relative to said MC are used for the position determination of said MU.

7. The locating or positioning system of claim 1 wherein said three FM broadcast stations are self-installed LPFM local broadcasting stations designated as FM1, FM2, FM3 located at known locations of BS, Rc and Rd forming FM1/BS, FM2/Rc, FM3/Rd stations respectively, wherein said BS, Rc, Rd locations are at boundary of a local map forming a triangle, wherein said FM1/BS is performing two-way communications with said MU, and wherein said three LPFM stations transmit general carrier frequencies permitted by government regulation, and wherein said pilot tone is a general sinusoidal waveform frequency modulating said three LPFM carrier frequencies, and wherein the wavelength of said pilot tone is no less than the dimension of said positioning system.

8. The locating or positioning system of claim 7 wherein a localized map in Cardinal coordinate is formed, and wherein said FM1/BS is located at (0,0) coordinate and said FM2/Rc station and FM3/Rd station are located at known coordinates (Xc, Yc), (Xd, Yd) respectively, and said MU is at unknown coordinate (x, y); and wherein the distances between said BS to said Rc Rd are D12, D13 respectively, wherein said localized map is further divided into finite grid points with known Cardinal coordinates, each said grid point corresponding to a computed distance differences pair ($d_{12}$, $d_{13}$), which is the distances from said grid point to said BS subtracted by distance to said Rc, Rd to form a computed distance differences pair, and wherein said computed distance differences pairs of all grid points are stored in a computer look-up table memory at said BS.

9. The locating or positioning system of claim 8 wherein said MU and BS perform phase measurements of said pilot tones of said FM1, FM2 and FM3 with respect to said MC, wherein phase measurements of said pilot tone from FM1 are subtracted by phase measurements of said pilot tones from said FM2, FM3 to form a measured phase differences pair at said MU and BS designated as $(d_{12m}, d_{13m})$, $(d_{12b}, d_{13b})$ respectively, with said phase differences pair $(d_{12m}, d_{13m})$ transmitted to BS, wherein a defined double differences pair $(Dd_{12m}, Dd_{13m})$ is formed by said phase difference pair $(d_{12m}, d_{13m})$ subtracting said phase difference pair $(d_{12b}, d_{13b})$ and said (D12, D13), respectively; wherein said double difference pair $(Dd_{12m}, Dd_{13m})$ is then compared to each entry of said distance differences pairs $(d_{12}, d_{13})$ stored at said look-up table to determine the MU position by minimum distance match, wherein a least square error (LSE) of subtraction between said $(Dd_{12m}, Dd_{13m})$ pair and said $(d_{12}, d_{13})$ pair is used to determine the location of said MU at corresponding grid point.

10. The locating or positioning system of claim 9 wherein each grid point is further divided into finer resolution grid points, wherein said distance differences pair $(d_{12}, d_{13})$ from said finer resolution grid points to BS versus Rc, Rd are computed and stored in a secondary look-up table memory corresponding to each said grid point, wherein after said grid point location of MU is determined, a secondary look-up table corresponding to said grid point is used to determine finer resolution of said MU, wherein said LSE between said double differences $(Dd_{12m}, Dd_{13m})$ pair and said distance differences pairs $(d_{12}, d_{13})$ in said secondary look-up table is used to determine a finer resolution location of said MU.

11. The locating or positioning system of claim 8 wherein more than three LPFM stations are used for 2-D positioning, wherein each combination of three LPFM stations out of more than three LPFM stations has its corresponding look-up table, and wherein three LPFM stations with best three received RSSI (radio signal strength indicator) by said MU at current location are selected to be the best three LPFM stations, and said best three LPFM stations with corresponding look-up table are used for positioning of said MU.

12. The locating or positioning system of claim 8 wherein four or more LPFM stations are used for 3-D positioning of said MU, wherein one of said LPFM stations located at a higher up vertical position is designated as third reference station (Re) to be used for 3-D positioning, wherein other three LPFM stations with the best RSSI received by said MU are designated as said BS, Rc, and Rd wherein said BS, Rc, Rd and Re are forming the best four LPFM stations for locating said MU, wherein said BS to said Rc, Rd, Re station distances are D12, D13, D14 respectively, wherein said grid point coordinate map is expanded to a 3-D grid point coordinate map corresponding to said best four LPFM stations, and wherein a computed distance differences triplet $(d_{12}, d_{13}, d_{14})$ corresponding to each grid point is derived from the distances to said best four LPFM stations in respective order, said distance difference triplets are stored in a look-up table memory, wherein other combination of four LPFM stations will form individual look-up table, and wherein said MU and BS perform measurements with respect to said MC of phase differences from said best four LPFM stations in respective order to form triplets as $(d_{12m}, d_{13m}, d_{14m})$ and $(\underline{d}_{12b}, \underline{d}_{13b}, \underline{d}_{14b})$ respectively, and wherein said D12, D13, D14 are then subtracted from the differences of said two triplets $(d_{12m}, d_{13m}, d_{14m})$ and $(\underline{d}_{12b}, \underline{d}_{13b}, \underline{d}_{14b})$ to derive a double differences triplet $(Dd_{12m}, Dd_{13m}, Dd_{14m})$ at said BS, wherein said double differences triplet $(Dd_{12m}, Dd_{13m}, Dd_{14m})$ is then compared to each entries of said look-up table triplets $(d_{12}, d_{13}, d_{14})$ for minimum distance match, wherein LSE between said measured double differences triplet and said look-up table triplet determine said MU position at said corresponding grid point.

13. The locating or positioning system of claim 7 wherein said FM1/BS transmitted pilot tone is used as synchronization waveform, and wherein said BS perform a phase shift of said pilot tone whenever said MU is synchronization ready, and wherein the next rising edge after said phase shift of said pilot tone indicates the synchronized MC for said MU and BS, wherein said MU and BS perform phase measurements of said three or more LPFM stations with respect to said MC.

\* \* \* \* \*